3,494,129
FLUID COMPRESSORS AND TURBOFAN ENGINES EMPLOYING SAME
James N. Krebs, Marblehead, Mass., and Leroy H. Smith, Jr., Cincinnati, Ohio, assignors to General Electric Company, a corporation of New York
Filed Mar. 6, 1968, Ser. No. 710,823
Int. Cl. F02k 3/02; F04d 25/02, 19/02
U.S. Cl. 60—226                              8 Claims

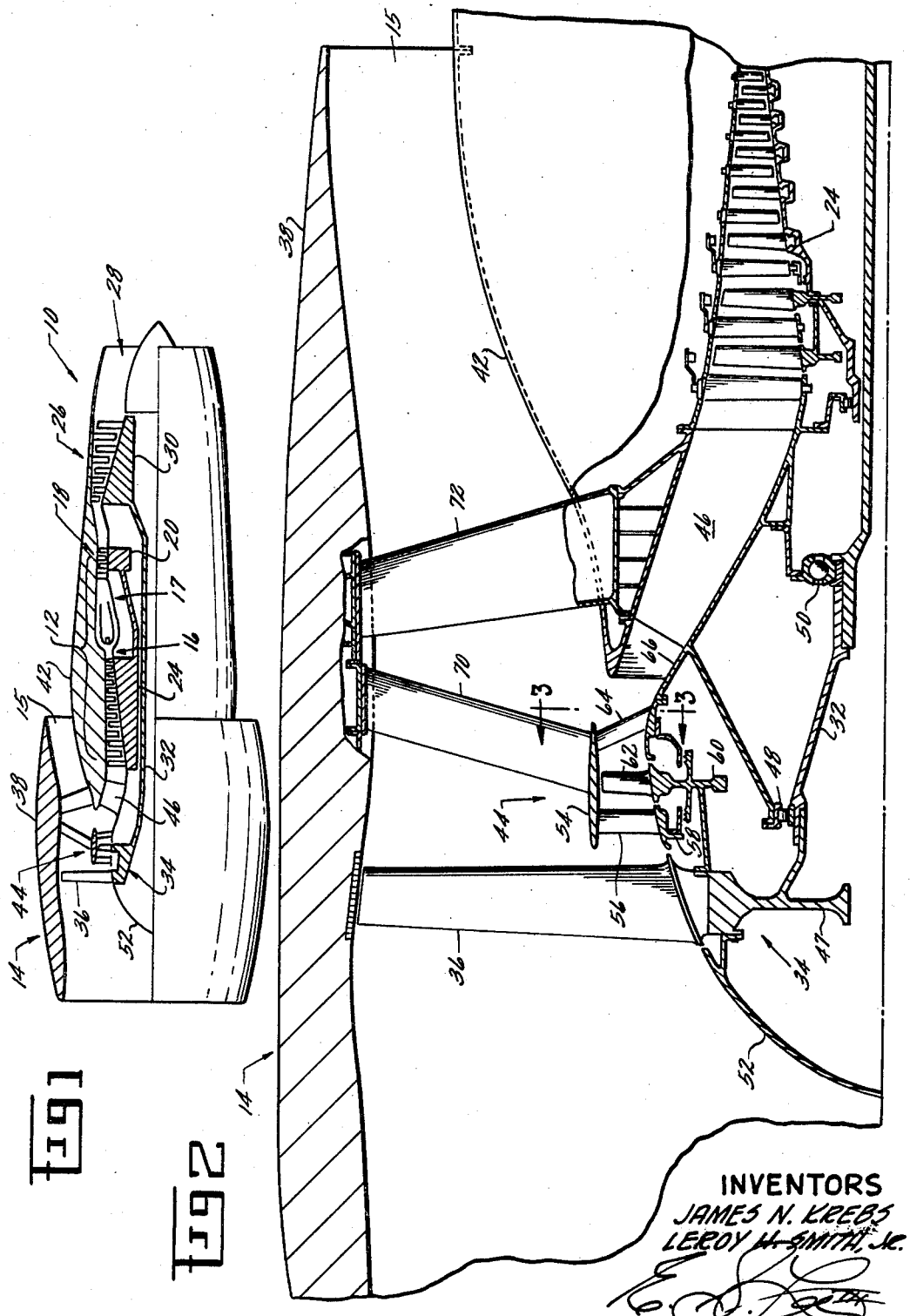

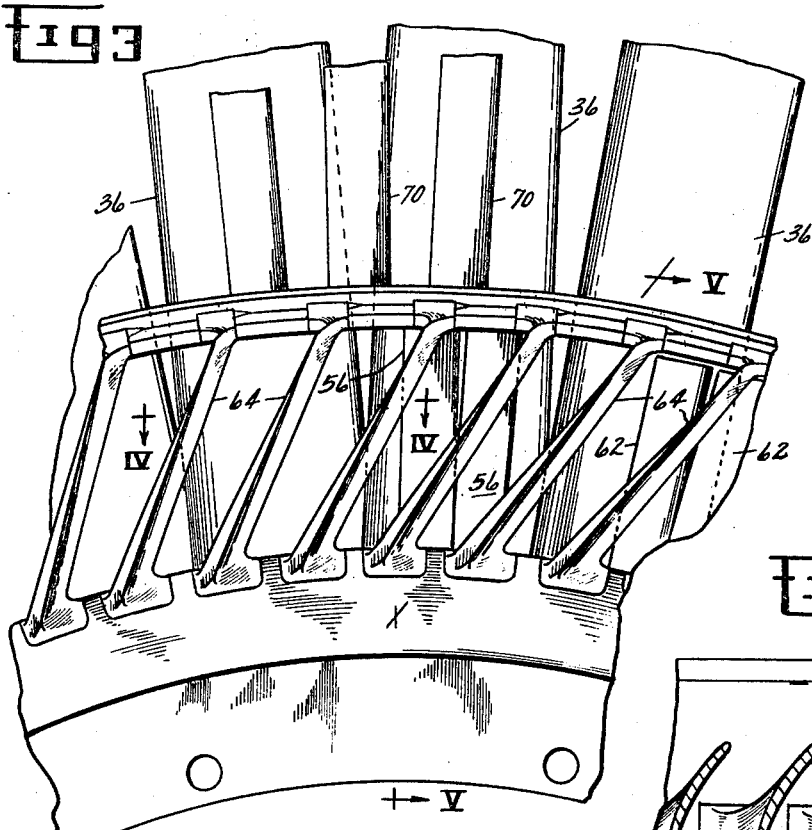
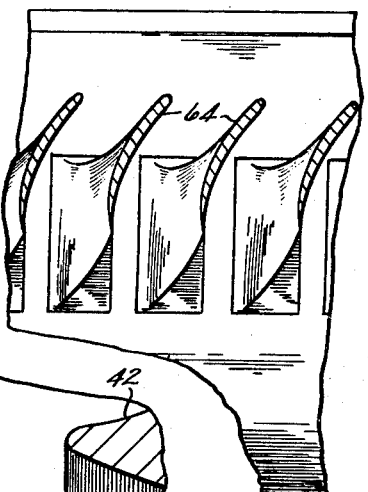
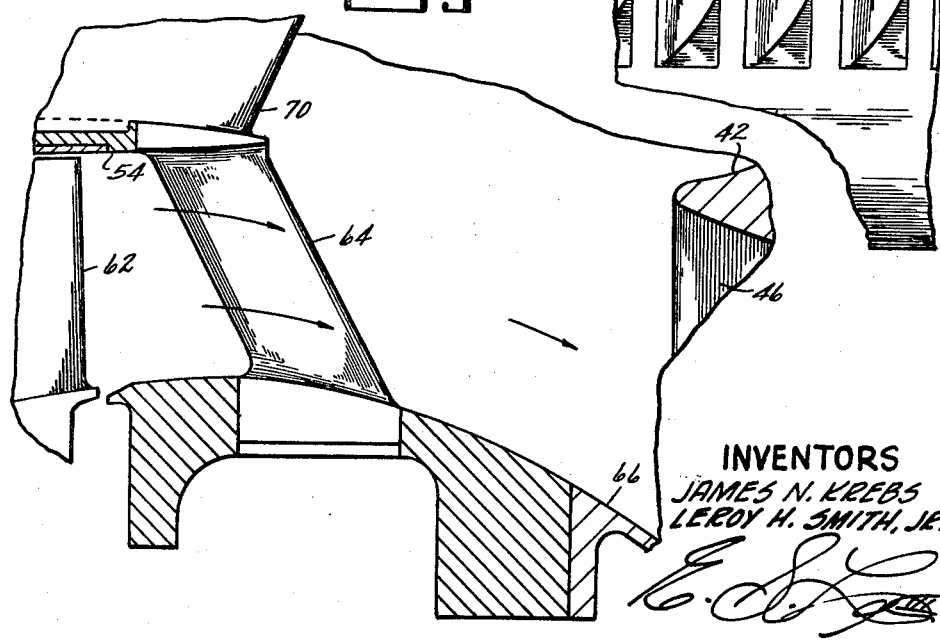
INVENTORS
JAMES N. KREBS
LEROY H. SMITH, JR.
ATTORNEY United States Patent Office 3,494,129
Patented Feb. 10, 1970

ABSTRACT OF THE DISCLOSURE

The disclosure shows a turbofan engine comprising a core engine and a fan rotor disposed upstream of the core engine and driven thereby. The fan may be considered as a compressor and has a first row of blades which project from the hub of a rotor to a surrounding cowl. A fractional fan stage is provided by a second row of relatively short blades projecting from the fan rotor downstream of the first row of blades. A splitter ring encompasses the second row of blades. The leading edge of a nacelle is spaced downstream of the trailing edge of the splitter ring. The outer surface of the nacelle defines the inner bounds of the outer portion of the air flow path of the fan, while the inner portion of the nacelle defines an inlet to the core engine. Outer and inner outlet guide vanes extend respectively from the splitter ring to the cowl and from the splitter ring to the inner bounds of the flow path through the fan. These outlet guide vanes are swept in a downstream direction from the splitter ring. Further, the inner outlet guide vanes are canted so as to turn the discharge of the fractional stage inwardly toward the core engine inlet.

---

The present invention relates broadly to improvements in fluid compressors having particular applicability to a more specific aspect of the invention which is to provide improvements in gas turbine engines of the turbofan type.

Turbofan engines comprise a core engine which generates a hot gas stream. This hot gas stream drives a turbine which, in turn, is connected to a fan rotor. The fan rotor has at least one circumferential row of blades projecting into an annular passage, the outer bounds of which are defined by a cowl which is of a larger diameter than the core engine. The fan pressurizes an air stream in a fan duct. The fan stream and the hot gas stream are discharged through separate nozzles or a common nozzle to provide a propulsive force. Advantageously the inlet to the core engine is downstream of the fan so that there would be an initial pressurization of the air entering the core engine.

The ratio of the mass of air flowing through the fan duct and thus bypassing the core engine to the mass of air flowing through the core engine is referred to as the bypass ratio. Recent developments have demonstrated that for a given engine weight, increased propulsive force and reduced fuel consumption can be attained from turbofan engines having a relatively high bypass ratio, for example, 5/1 or higher.

In order to obtain such high bypass ratios the diameter of the fan rotor blades has become quite large. Further, the peripheral speeds of the tips of these blades is also quite high, reaching supersonic velocities. Such large diameters and high speeds could result in some fairly obvious disadvantages insofar as size and weight are concerned.

Particular emphasis has recently been placed on the problem of gas turbine engine noise in the operation of aircraft. The source of objectionable noise in turbojet and low bypass ratio turbofan engines is generated primarily by the discharge of a hot gas stream from a propulsive nozzle. However, in high bypass turbofan engines the high speeds and high mass flows of the fan generate the predominant source of objectionable noise.

One object of the invention, accordingly, is to reduce the noise generated by the fans of high bypass ratio turbofan engines.

Another problem associated with the large diameters of high bypass ratio turbofan engines is that the large diameters inherently involve a large frontal area for the engine when it is installed on an aircraft. This large frontal area has a drag effect which reduces the installed propulsive effectiveness of the engine. This disadvantage is in addition to the more obvious weight penalties generally inherent in large fans. Accordingly, a further object of the invention is to reduce, for a given thrust rating, the diameter of the fan of a turbofan engine and thereby reduce the frontal area of the engine as well as its weight.

As was indicated above, it is preferable that the air entering the turbofan core engine be partially pressurized by the fan. It has been an accepted practice to divert the inner portion of the air pressurized by a fan into the core engine. In designing such turbofan engines, primary consideration is given to highly efficient operation at a given cruise point where the major part of the flight regime is carried out. It is more or less a routine procedure to calculate and size the fan components and the core engine components so that air flows freely into the core engine with proper aerodynamic loadings on the fan as well as the compressor employed in the core engine. However, more difficult problems are presented in working under off design conditions, particularly where there is a sharp decrease in the thrust of the engine. When this occurs, the ability of the core engine to accept air discharged from the fan is reduced at a faster rate than the reduction of air discharged from the fan. This is sometimes referred to as "an increase in bypass ratio" in that the mass of air flowing through the fan becomes much higher relative to the amount of air flowing through the core engine. Under such conditions it is necessary to prevent excessive aerodynamic loading on the fan which could result in a stall condition. Such a stall condition could, if it propagated fully, cause a total loss of power from the engine.

Accordingly, another object of the invention is to accomplish the above ends and, further, to provide a turbofan engine, of simple and reliable construction, which is capable of stall-free operation under such off-design conditions.

In order to obtain a lightweight and efficient core engine in a turbofan engine of high bypass ratio, it is also necessary that the diameter of the core engine be maintained at a minimum. The hub diameter of the fan, while reduced in accordance with the present invention, nonetheless is greater than the diameter of the entrance to the core engin. This, in turn, means that it is necessary to turn the flow path of the air from the fan in a direction that is curved longitudinally inwardly.

Yet another object of the invention is to provide a fan construction having means for so turning the fan discharge path inwardly in an efficient manner, with a minimum of losses and in a minimum of axial length, to thereby minimize engine length and weight.

It will also be apparent that the problems of turning the flow of air about a longitudinally curved, annular flow path are not necessarily limited to controlling flow of fluid from a fan to the inlet of a core engine, and in this connection reference is made to a simultaneously filed application, Ser. No. 710,824, in which the inventive concepts relating to turning the flow of fluid in an annular duct, per se, are separately claimed by the present applicant, Leroy H. Smith, Jr. Both of these applications are of common assignment.

One known approach to increasing the energy input of a fan is to employ non-constant energy blades. Such blades pressurize the air stream to a greater extent at their tips than at their bases. This approach, however, has the limitation that much of its advantage is lost in taking the swirl out of the pressurized air in order that it may be most effectively discharged through a propulsive nozzle. Outlet guide vanes are employed to deswirl the air and direct it essentially in a longitudinal direction after it has been discharged from the fan. With non-constant energy blades there tends to be an aerodynamic overloading at the inner ends of the outlet guide vanes which can cause a stall condition, which, if uncontrolled, could cause loss of power from the engine. This energy gradient problem becomes of further significance when it is recognized that, consistent with the above objectives, it is desired to reduce the overall diameter of the fan, and yet in order to obtain sufficient mass flow of air through the fan, a given fan duct area must be maintained. This results in employing a relatively low ratio of the fan hub radius to the fan blade tip radius. Such a relatively small radius ratio, in turn, results in a large radial energy gradient since the reduced blade peripheral speed at the reduced hub radius limits the energy-additional capability of the blading at that location.

Another object of the invention is to avoid aerodynamic overloading problems in a fan construction having a relatively small hub radius to fan tip radius ratio as well as to increase the overall pressurization level of an air stream pressurized by such a fan.

Another effect of attaining the above ends is to reduce the overall diameter of a fan required to maintain a given flow and pressurization level. Recognizing the fact that the term fan refers to a specialized form of compressor, it will be apparent that another object of the invention is to provide increased mass flow and pressurization levels for compressors of a given diameter.

In one aspect of the invention certain of the above objects are attained by a turbofan engine which comprises a core engine and a fan driven by the core engine. The fan includes a rotor, a cowl concentric of the rotor, and a circumferential row of relatively long blades extending from the rotor hub to the cowl. A splitter ring is spaced downstream of these blades and is concentrically spaced between the rotor hub and the cowl. A circumferential row of relatively short blades projects from the rotor hub to the splitter ring and a circumferential row of stator vanes extends inwardly from the splitter ring between the two rows of blades. A secondary splitter is spaced downstream of the splitter ring with its inner surface defining the outer bounds of the entrance to the core engine inlet and its outer surface defining, in combination with the cowl, a duct for air pressurized by the fan.

Preferably, the relatively long blades are of the non-constant energy type, having an increasing energy gradient from hub to tip. It is also preferable that outlet guide vanes be provided. An outer set of outlet guide vanes extends from the splitter ring outwardly to the cowl, and an inner set of outlet guide vanes extends from the splitter ring to the inner bounds of the flow path of air discharged from the fan at the entrance to the core engine inlet. Preferably both sets of outlet guide vanes are swept downstream from the splitter ring. Further, the flow path from the fan discharge to the core engine inlet is turned about a relatively small radius to minimize overall engine length and weight and the inner outlet guide vanes are canted from radial positions so as to effectively turn the air around this curved flow path into the core engine inlet.

In another aspect of the invention certain of the above objects are attained by a compressor comprising a rotor and an outer duct member concentric of this rotor. A circumferential row of relatively long blades extends from the rotor hub to the outer duct member, and a splitter ring is provided closely downstream of the blades concentrically spaced between the rotor hub and the outer duct member. A circumferential row of relatively short blades projects from the rotor hub to the splitter ring, and a circumferential row of stator vanes extends inwardly from the splitter ring, between said two rows of blades. The stator vanes turn the inner portion of the flow of fluid discharged from the first row of blades to a proper entrance angle relative to the second row of blades. A common plenum is provided downstream of said splitter into which the presurized fluid from the rotor blades is discharged. This gives a relatively high pressurization energy level to a large volume of fluid with a minimum outer duct diameter.

The above and other related objects and features of the invention will be apparent from a reading of the following description of the disclosure found in the accompanying drawings and the novelty thereof pointed out in the appended claims.

In the drawings:

FIGURE 1 is a simplified showing of a turbofan engine embodying the present invention;

FIGURE 2 is a longitudinal, half section of the forward portion of the engine seen in FIGURE 1;

FIGURE 3 is a section taken on line III—III in FIGURE 2;

FIGURE 4 is a section taken on line IV—IV in FIGURE 3; and

FIGURE 5 is a section taken on line V—V in FIGURE 3.

FIGURE 1 is a simplified showing of a turbofan engine 10. This engine comprises a core engine 12 which generates a hot gas stream and a fan or low pressure compressor 14. The fan 14 is powered by the core engine and pressurizes an air stream which is discharged from a nozzle 15 to provide a propulsive force.

The core engine comprises a high pressure compressor 16 which pressurizes an annular stream of air to support combustion of fuel in a combustor 17. The hot gas stream, thus generated, is discharged through a high pressure turbine 18 to drive a turbine rotor 20. This rotor is connected to and drives the rotor 24 of the high pressure compressor 16. The hot gas stream then passes through a low pressure turbine 26 and is discharged through a primary nozzle 28 to provide a propulsive force.

The low pressure turbine 26 includes a rotor 30 which is connected by an inner shaft 32 to a fan rotor 34 at the inlet end of the engine. The fan rotor 34 has a row of blades 36 secured to its hub and projecting to a cowl 38. The outer portion of the air stream, pressurized by the fan blades 36, is discharged through the nozzle 15, which is defined by the downstream end of the cowl 38 and a nacelle 42 within which the core engine is housed. The inner portion of the air pressurized by the fan blades 36 is further pressurized by a fractional fan stage 44 and then directed to an inlet duct 46 leading to the core engine 12 and specifically the high pressure compressor 16.

Reference is next made to FIGURE 2 for a more detailed description of the fan 14. The fan rotor 34 comprises a disc 47 which is secured to the compositely formed tubular shaft 32, connecting it with the low pressure turbine rotor 30. Appropriate bearings, as at 48 and 50, are provided for journaling this shaft. The blades 36 can be secured to the disc 47 in a known fashion. A bullet nose 52 is secured to the forward end of the disc 47.

The fractional fan stage 44 comprises a splitter ring 54 having its leading edge disposed adjacent the downstream ends of the blades 36. Stator vanes 56 extend inwardly from the ring 54 to an inner shroud 58. A disc 60 is secured to the disc 47. A circumferential row of relatively short blades 62 is mounted on the disc 60. These blades terminate adjacent the ring 54. Outlet guide vans 64 extend from the downstream end of the ring 54 to a compositely formed casing 66 which defines, in part, the inner bounds of the fan stream flow path and the inner bounds of the core engine inlet 46. The remainder of the inner bounds of the fan flow path are defined by platforms at the bases of the blades 36 and 62 and the vanes 56, all of the flow path defining means being generally aligned with the hub of the fan rotor. The outer surface of this inlet duct 46 is defined by the inner surface of the nacelle 42.

Outlet guide vanes 70 extend from the ring 54 to the cowl 38 and provide further structural interconnections between the stationary portions of the fractional stage 44 and the cowl. Struts 72 extend between the cowl 38 and the nacelle 42 to provide structural connections therebetween.

The relatively long fan blades 36 are preferably of the non-constant energy type well known to those skilled in the art. Such blades, as herein contemplated, are shaped so as to have an operationally safe, maximum aerodynamic loading at all points in a radial direction. This means that a greater pressure rise is obtained at the tip ends of the blades than at their hub ends. The total pressurization and energy imparted to the fan air stream is thus maximized for a given fan area and rate of fan rotation. This, in turn, for a given thrust requirement, enables use of a minimum fan diameter and rate of rotation to obtain a desired pressurization level.

However, the necessary mass of air flow requires a large inlet area for the fan. To obtain this area it is necessary that the ratio of the hub radius to tip radius of the blades 36 be relatively low. Because of this, pressurization of the inner portion of the fan stream toward the hub ends of the blades is relatively low. Further, there is a rather extreme pressure gradient immediately downstream of the blades 36 in a radial direction. The fractional fan stage 44 provides two functions. First, it isolates the outer portion of the fan stream so that the pressure gradient, in a radial direction, from tip ends of the blades 36 to the splitter 54, is relatively low. Secondly, the relatively short row of blades 62 further increases the pressure level of the inner portion of the fan stream, thereby increasing the overall pressurization level of the total fan stream.

The desirability of minimizing the radial pressure gradient is of greatest significance in connection with avoiding excessive aerodynamic loadings on the inner ends of the outlet guide vanes 70. Considering for a moment the outer portion of the fan stream between the splitter ring 54 and the cowl 38, air discharged from the fan blades 36 has a tangential velocity component, referred to as swirl. In order that the pressurized air discharged from the fan can be effectively utilized as it is discharged from the nozzle 15, it is necessary that this tangential velocity component be removed. Another function of the cambered outlet guide vanes 70 is to deswirl the air and direct it generally longitudinally toward the nozzle 15. The inner outlet guide vanes 64 also have a similar function in that they are cambered to deswirl the air discharged from the blades 62 and direct it in a generally longitudinal direction.

As the air approaches the outer guide vanes 70, there is a gradient in both total and static pressures, varying from a maximum at or near the cowl 38 to a minimum at the splitter ring 54. In passing through the cascade of outlet guide vanes 70, there is a rise in static pressure to a substantially uniform value, radially from the splitter ring to the cowl 38. Since the inlet static pressure is less at the inner ends of vanes 70 than at their outer ends, a greater rise in static pressure is required at the inner ends of the vanes 70. In order that this rise be obtained, it is necessary that there be sufficient total pressure for the air to flow between the vanes without undue aerodynamic loading, i.e., separation of air flow from the cambered vane surfaces, resulting in a stall condition.

As was previously pointed out, by isolating the outer portion of the fan stream by the splitter 54, the energy gradient, which can be equated to the total pressure gradient, is minimized, thereby minimizing the aerodynamic loading at the inner ends of the outlet guide vanes. Further features contribute to minimizing the aerodynamic loading on the inner ends of the outlet guide vanes 70. These features contribute primarily to minimizing the static pressure at and adjacent the trailing edge of the splitter ring 54. As was pointed out, the cascade of blades 70 acts to increase the static pressure at their discharge ends. The same applies to the inner outlet guide vanes 64. Further, it will be seen that there is a common plenum downstream of the splitter ring 54 which, due to the obstruction provided by the vanes 70 and 64, has a diffuser effect which tends to increase static pressure. The increase in static pressure is minimized at the inner ends of the vanes 70 by sweeping the guide vanes 70 and 64 downstream from the splitter ring 54, as illustrated.

While the hub to tip radius ratio of the fan blades 36 is relatively low, nonetheless the hub radius of the rotor blades 62 is substantially greater than the hub radius of the first stage of the high pressure compressor 16. This means that the inlet duct 46, and particularly the inner wall member 66, must slope inwardly to direct the inner portion of the fan discharge to the core engine.

Reverting to the above discussion of the desirability of minimizing static pressure rise at the downstream edge of the splitter ring 54, one way of attaining this reduction in static pressure would be to restrict or have a minimum radial distance in the common plenum downstream of the splitter ring. As can be seen from FIGURES 2 and 5, the wall 66 increases in diameter downstream of the blades 62. This is not only a factor in minimizing the static pressure at the downstream edge of the splitter ring 54, but also enables a somewhat greater diameter for the splitter ring, which further minimizes the static pressure and aerodynamic loading of the outer outlet guide vanes 70.

Having minimized the aerodynamic loadings in the vanes 70 in the manner described, means are now provided for efficiently turning the inner portion of the fan stream inwardly around a relatively small radius to direct it toward the core inlet duct 46. The means employed are best illustrated in FIGURES 3, 4 and 5, wherein it will be seen that the inner outlet guide vanes 64 are canted from radial positions so that their concave surfaces fare generally towards the convexly curved inner wall. While simply canting the vanes will provide a desired turning effect, this feature, in combination with the fact that the inner outlet guide vanes are swept, as shown in FIGURE 5, again assists in minimizing the plenum area immediately downstream of the splitter ring 54. In being swept, it is preferred that the forward edge of the inner end of the inner outlet guide vanes 64 is substantially aligned with the trailing edge of the splitter ring 54. It is also preferable, for minimization of losses, that the inner duct wall be convexly curved throughout the length of the canted vanes 64, as illustrated. With the vanes 64 swept, the inward curvature of the wall 66 begins at a point approximately aligned with the splitter ring trailing edge.

The preceding description has been predicated primarily on operation of the engine at a given design point, that is, at a specified altitude and flight Mach No. Under these conditions, there is, of course, a minimum of turbulence at the confluence of the inner and outer portions of the fan stream downstream of the splitter. The air pressurized by the inner portion of the blades 36 and further pressurized by the short blades 62 for the most part enters the inlet duct 46. The remaining air flows freely across the leading edge of the nacelle 42 which functions as a secondary splitter.

Under off-design conditions, as where there is a deceleration of thrust, these flow conditions change. To reduce thrust, fuel flow to the core engine can be reduced, whereupon there is a relatively rapid deceleration in the rotation of the core engine rotor. However, because of inertia, the fan rotor slows down at a much lower rate. When the core engine rotor slows down, there is a reduced capability for air to flow through the core engine. However, the amount of air discharged from the fan 36 remains at a relatively high level. By having the leading edge of the nacelle 42 spaced from the trailing edge of the splitter ring 54, air which would normally enter the engine inlet 46 readily changes its flow path into the duct between the nacelle and the cowl, under what would be referred to as a high bypass operating condition. This is accomplished with a minimum disturbance to the air flow and does not create any substantial increase in back pressure on the inner outlet guide vanes, which could cause an aerodynamic overloading thereon and a resultant stall condition. This decoupling of the fan from the core engine provides an automatic, reliable mode of operation under off-design conditions, which is extremely simple.

While the present description has been directed to a turbofan engine environment, it will be apparent that the fan arrangement described, could have utility in other environments. In this connection it should be recognized that the fan is, in fact, a compressor, which provides a high pressurization level for an annular flow stream having a relatively large area with a minimum diameter.

Although a preferred embodiment of the present invention has been depicted and described, such is intended to be exemplary and not definitive, and it will be apparent to those skilled in the art that many alterations and variations may be made thereto without departing from the invention's fundamental theme.

Having thus described the invention, what is claimed as novel and desired to be secured by Letters Patent of the United States is:

1. A turbofan engine comprising,
a core engine,
a fan including,
a rotor driven by said core engine,
a cowl concentric of said rotor and defining the outer bounds of air flow through the fan,
means generally aligned with the hub of said rotor for defining the inner bounds of airflow through said fan,
a circumferential row of relatively long blades extending from the rotor hub to the cowl,
a splitter ring closely spaced downstream of said blades, said splitter ring being between and concentrically spaced from, the rotor hub and the cowl,
a circumferential row of relatively short blades projecting from said rotor hub to said splitter ring, and
a circumferential row of stator vanes extending inwardly of said splitter ring between said two rows of blades, said stator vanes turning the inner portion of air discharged from said row of long blades to a proper entrance angle relative to said row of short blades,
a secondary splitter having a leading edge spaced downstream from the trailing edge of said splitter ring whereby there is a common plenum for the fan discharge between the splitter ring and the secondary splitter,
said secondary splitter having an inner surface defining the outer bounds of the entrance of the core engine inlet and an outer surface defining in combination with the cowl a duct for air pressurized by the fan, and
a wall member, formed as a continuation of the means defining the inner bounds of the fan flow path, which defines the inner bounds of the core engine inlet.

2. A turbofan engine as in claim 1 further comprising,
an inner, circumferential row of outlet guide vanes extending inwardly from the splitter ring to the means defining the inner bounds of the fan flow path and
an inner, circumferential row of outlet guide vanes extending between said splitter ring and said cowl,
the outlet guide vanes of both rows being cambered to deswirl the fluid discharged from said rotating blades and direct it generally longitudinally of said flow path.

3. A turbofan engine as in claim 2 wherein,
said relatively long blades are of the non-constant energy type providing an energy level, to the air stream pressurized thereby, which progressively increases from the hub end of the blades to the tip ends thereof and
both said inner and outer rows of outlet guide vanes are swept in a downstream direction from the trailing edge of said splitter ring,
whereby aerodynamic loading on the inner ends of the outer row of outlet guide vanes is minimized.

4. A turbofan engine as in claim 3 wherein,
the wall member defining the inner bounds of the core engine inlet converges inwardly in a downstream direction,
the means defining the inner bounds of the fan flow path comprises a convexly curved wall portion connecting with the converging inlet wall member,
the inner ends of the inner row of outlet guide vanes project from said curved wall portion and
said inner outlet guide vanes are canted from positions radial of the rotor axis with their concave surfaces facing towards said convexly curved wall portion,
whereby the engine inlet length may be minimized.

5. A turbofan engine as in claim 4 wherein,
said convexly curved wall portion is downstream of the trailing edge of said splitter ring,
whereby the common plenum area is maintained at a minimum at the trailing edge of said splitter ring.

6. A turbofan engine as in claim 2 wherein,
the wall member defining the inner bounds of the core engine inlet converges inwardly in a downstream direction,
the means defining the inner bounds of the fan flow path comprise a convexly curved wall portion, connecting with the converging inlet wall member,
the inner ends of the inner row of outlet guide vanes project from said curved wall portions, and
said inner outlet guide vanes are canted from positions radial of the rotor axis, with their concave surfaces facing toward said convexly curved wall portion,
whereby the engine inlet length may be minimized.

7. A turbofan engine as in claim 6 wherein,
said convexly curved wall portion is downstream of the trailing edge of said splitter ring and
said inner row of outlet guide vanes are swept in a downstream direction from said splitter ring.

8. A compressor comprising,
a rotor,
an outer duct member concentric of said motor and defining the outer bounds of an annular flow path,
means generally aligned with the hub of said rotor and defining the inner bounds of the annular flow path,
a circumferential row of relatively long, non-constant energy blades extending from the rotor hub to the outer duct member, said blades adapted to provide an energy level to the fluid stream pressurized thereby which progressively increases from the hub end of the blades to adjacent the tip ends thereof,
a splitter ring closely spaced downstream of said blades, said splitter ring being between and concentrically spaced from the rotor hub and the outer duct member,
a circumferential row of relatively short blades projecting from said rotor hub to said splitter ring,
a circumferential row of stator vanes extending inwardly from said splitter ring, between said two rows of blades, said stator vanes turning the inner portion of fluid discharged from said row of long blades to a proper entrance angle relative to said row of short blades, a common plenum downstream of said splitter ring into which fluid pressurized by the rotor blades is discharged, an inner, circumferential row of outlet guide vanes extending inwardly from said splitter ring to the means defining the inner bounds of said annular flow path, and an outer, circumferential row of outlet guide vanes extending between said splitter ring and said outer duct member, said inner and outer guide vanes being swept in a downstream direction from the splitter ring and cambered to deswirl the fluid discharge from said rotating blades and direct it generally longitudinally of said flow path, whereby a relatively high pressurization energy level of a large volume of fluid may be obtained in the common plenum.

References Cited

UNITED STATES PATENTS

| 3,390,527 | 7/1968 | Decher | 60—226 |
| 3,398,535 | 8/1968 | Campbell | 60—226 |

FOREIGN PATENTS

| 617,164 | 2/1949 | Great Britain. |

OTHER REFERENCES

General Electric GE 1/6 Aviation Week and Space Technology, Aug. 16, 1965, p. 42 relied on.

MARK M. NEWMAN, Primary Examiner

D. HART, Assistant Examiner

U.S. Cl. X.R.

230—116, 122